July 15, 1958  J. GALEY ET AL  2,843,007
DEVICE FOR RECORDING CONTINUOUSLY THE TRUE
TEMPERATURE OF THE LIGHTING FLAMES
Filed May 18, 1954  2 Sheets-Sheet 1
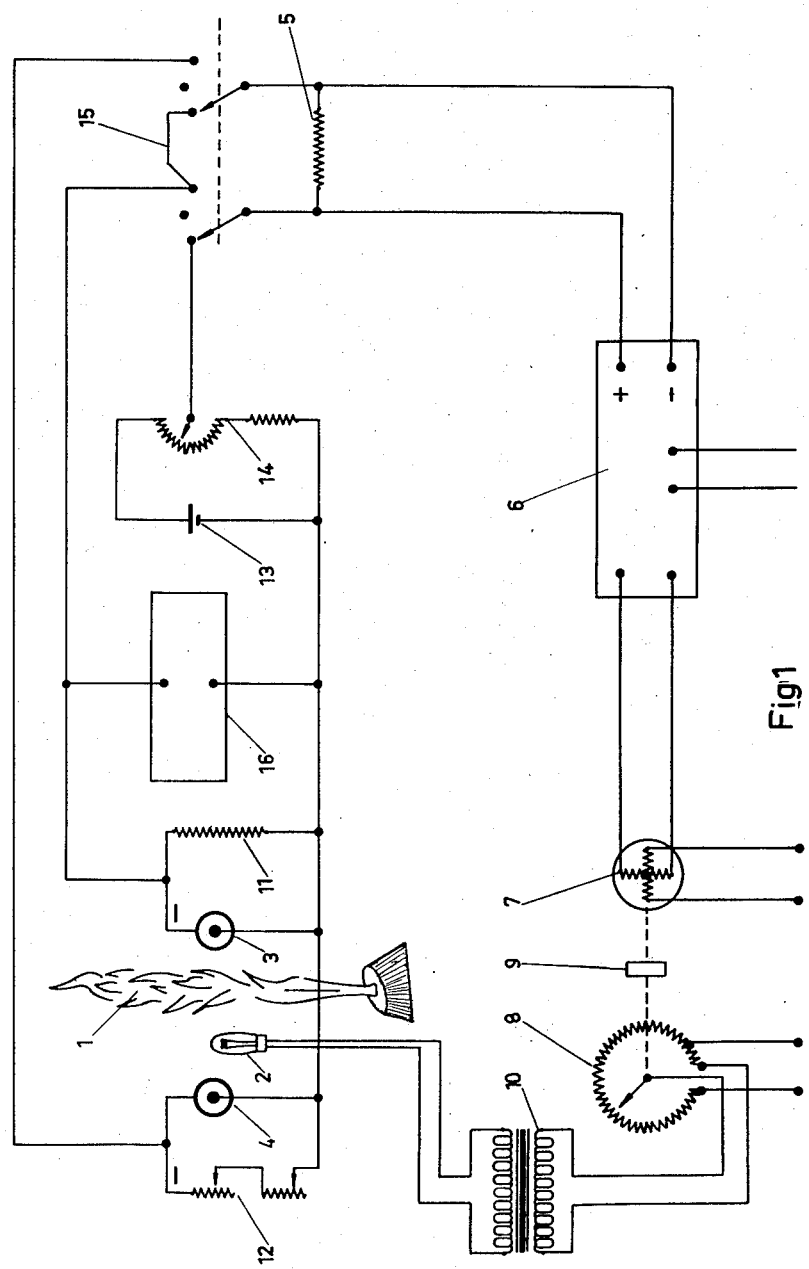
INVENTORS
Jean Galey &
Michel Denis
By A. John Michel
ATTORNEY

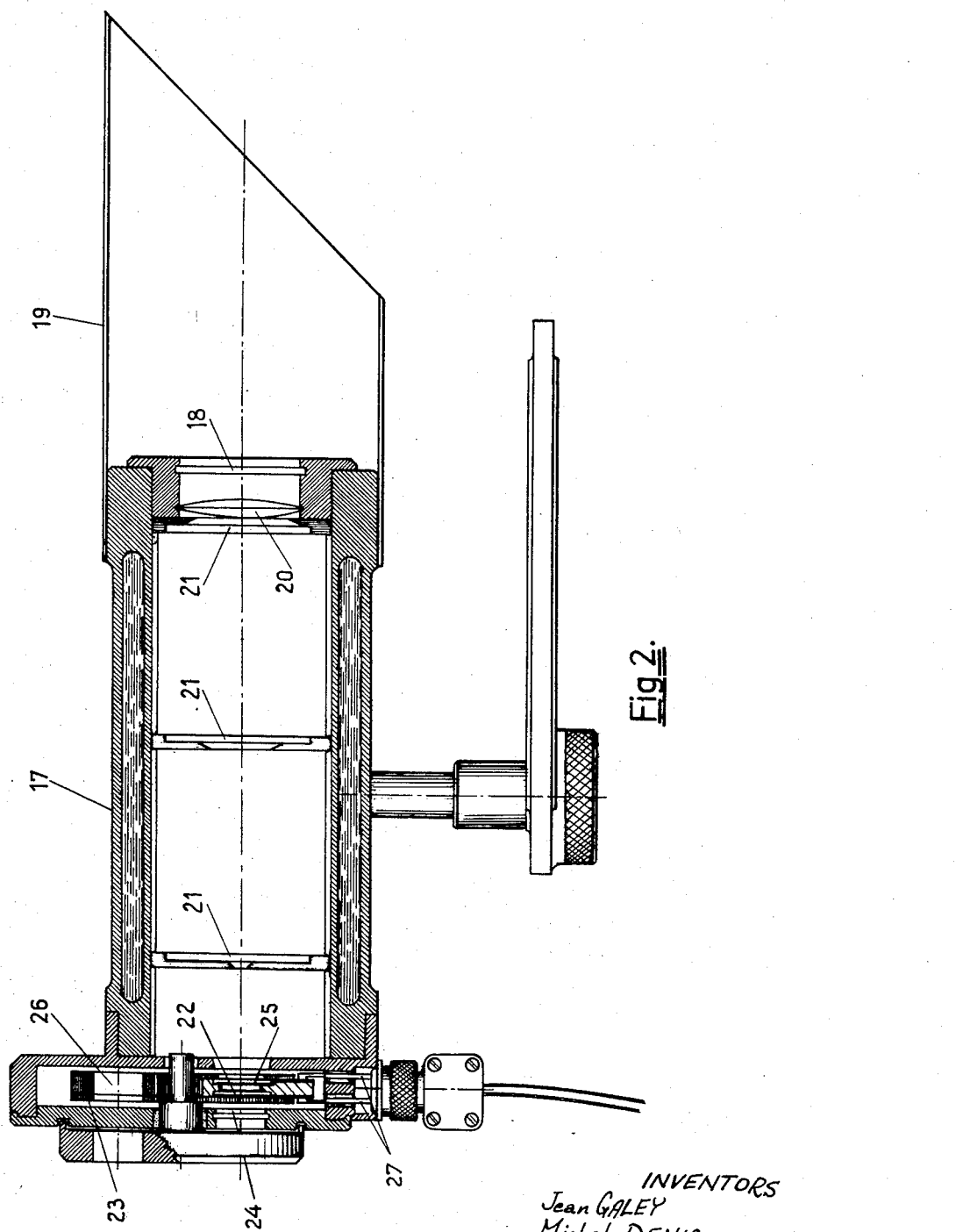

United States Patent Office 2,843,007
Patented July 15, 1958

2,843,007

DEVICE FOR RECORDING CONTINUOUSLY THE TRUE TEMPERATURE OF THE LIGHTING FLAMES

Jean Galey and Michel Denis, Paris, France, assignors to Institut de Recherches de la Sidérurgie, Saint-Germain-en-Laye, France, a professional institution of France Application May 18, 1954, Serial No. 430,634

Claims priority, application France May 29, 1953

5 Claims. (Cl. 88—22.5)

The invention relates to a system for recording the temperature of luminous flames, including flames which may be turned luminous by carbon particles or suitable metal salts.

In the present description and claims, the expression "luminous flame" designates any flame containing solid particles and consequently having a continuous spectrum of emissivity in the visible range. Such a flame has a considerable emissive power for all wavelengths, such factor being included for instance between 0.4 and 1. The above expression includes any flame having a continuous spectrum of emissivity in the range where a receiver of radiating energy is sensitive, for instance the bands of emissivity of certain gases contained in a flame. As a result, the above expression includes the majority of the flames which are met in industry, such as the flame of liquid fuels; tars or fuel oil, such as the flame of solid fuels; pulverised coal; most of the flames of gaseous fuels, such as synthesis gas, etc. Such flames are encountered in cement furnaces, glass furnaces and open-hearth furnaces, also in acid or basic Bessemer converters although such a flame is not exactly a heating flame.

The true temperature of a luminous flame may be measured by known methods, particularly by means of the Kurlbaum method. However, it is not possible in general to use this method in the case of the luminous flames met in industry, because the brightness of such flames varies continuously.

According to the Kurlbaum method, a pyrometer sights the filament of a tungsten strip lamp, the feed current intensity of which may be varied and measured. It is then possible to plot a graph showing the variations of the temperature (brightness) as a function of the feed current intensity. A light flame is arranged between the lamp and the pyrometer, and a graph indicating the variations of temperature (brightness) of both lamp and flame is plotted as a function of the feed current. Kurlbaum has proved that the two graphs intersect at only one point corresponding to the true temperature of the flame.

With the above arrangement, the emission of the flame may be represented by $\alpha b_T$, $\alpha$ being the emission or absorbing factor, $b_T$ the brightness of the black body at the temperature T.

The emission of the tungsten lamp may be represented as $b_s$, $s$ being the brightness (temperature) of the lamp.

At the intersection point of the two graphs, the pyrometer receives the emission of the flame, that is, $\alpha b_T$, plus the luminous flux from the lamp which has passed through the flame, that is $(1-\alpha)b_s$. On the whole, the pyrometer receives $\alpha b_T + (1-\alpha)b_s$.

The pyrometer gives the same response when there is no flame, that is, when it receives $b_s$; consequently at the intersection point, $\alpha b_T + (1-\alpha)b_s = b_s$. This condition is possible only when $s=T$.

According to the present invention, one of the pyrometers receives the first member of the equation and the other pyrometer receives the second member of the equation. The current intensity feeding the lamp is controlled in such a manner that the two pyrometers always have the same response.

The main object of the invention is to provide a device for recording the variations of the true temperature of a luminous flame the brightness of which varies owing to an auxiliary luminous source of a variable brightness and to a device continuously modifying said brightness as a function of the variations of brightness of the flame being measured, in such a manner that the amount of the brightness of the flame alone and of the brightness of the auxiliary source after its light passes through the flame, is equal to the brightness of the black body at the temperature of said flame.

Another object of the invention is to provide a device of the character described using the alternating current of any power system.

Other objects and advantages of the invention will be apparent during the course of the following description. In the accompanying drawings forming a part of this specification and in which like numerals are employed to designate like parts throughout the same, Fig. 1 is a diagram of a device according to the invention and Fig. 2 is an axial section of one of the two pyrometric measuring telescopes used in the above device.

According to Fig. 1 a light-emitting source 2, constituted of a special electric bulb with a tungsten strip, and a measuring telescope 3 including a radiant energy receiver, for instance a photocell, are arranged on both sides and approximately at the same distance of a luminous flame 1. On the other side of the light-emitting source with respect of the flame a second measuring telescope 4 is directed toward the source, this latter measuring telescope being identical with the first, that is including a photocell having for all temperatures the same response as the cell of the first measuring telescope.

The telescope 3 is directed to sight the lamp 2 through the flame while the second telescope, which may be called the "opposed telescope," is directed to sight the flame only. Both telescopes are mounted in opposed relationship by the intermediary of a resistance 5 having a fixed length. This differential arrangement is such that any lack of balance between the response currents of the two cells, owing to the fact that the flame temperature varies and is no longer equal to the temperature of brightness of the lamp, causes a difference of potential between the terminals of the resistance 5 to be evolved. This difference of potential is applied to the terminals of a measuring amplifier 6 which delivers an alternating voltage, the phase of which corresponds to the direction of the lack of balance. The measuring amplifier may be a zero balance device comprising an amplifier and a motor control device. The alternating voltage delivered is applied to the measuring phase of a two-phase motor 7 which may turn alternately in one direction or in the other in order to recover the balance by varying the brightness temperature of the lamp 2 in the same direction as the flame temperature. The motor 7 is mechanically linked to a device varying the intensity in the circuit feeding the lamp for instance an auto-transformer 8. The mechanical link may be a suitable speed-reducing gear mechanism 9, giving, for instance, a reduction ratio of 1 to 400. This reduction is necessary owing to the low value of the torque of the two-phase motor and provides the whole device with proper inertia. The auto-transformer which is fed by a power system, provides a variable voltage which is applied to the terminals of a transformer 10 adapted to lower the voltage. This transformer feeds the lamp with the tungsten strip with a variable voltage. Owing to this arrangement, the lamp follows exactly the fluctuations of the flame in spite of the fact that it is fed by an alternating current.

Between the terminals of each measuring telescope is mounted a load resistance which is a constant resistance 11 for the measuring telescope 3 and an adjustable resistance 12 for the opposed telescope 4.

The system is calibrated in the absence of a luminous flame by throwing switch 15 to substitute dry cell 13 for photocell 4 in the circuit, the dry cell giving a continuous voltage adjustable by resistance 14. The measuring photocell is calibrated by plotting a graph in millivolts-temperature, i. e. the millivolts emitted by photocell 3 at different temperatures thereof. A calibrating temperature between the maximum and the minimum temperature to be measured is selected and the corresponding voltage expressed in millivolts is obtained through the graph.

When switch 15 is actuated to put the calibration circuit in operation, i. e. to form a bridge comprising the measuring photocell 3, the resistance 14 and the dry cell 13, the photocell 4 is out of the circuit. In this way, a voltage delivered from cell 13 is opposed to that of the measuring photocell 3 at the terminals of resistance 5. If the voltage produced by photocell 3 is not identical to that of dry cell 13, the condition of unbalance produces a voltage at the terminals of resistance 5. This voltage is applied to the servo-mechanism which responds to change the temperature of lamp 2 in such a manner that the measuring photocell 3 produces a voltage equal to the voltage of cell 13. At that time, the system is balanced and the switch is operated again to put the circuit in its measuring position, i. e. the cell 13 and resistance 14 are disconnected from the circuit and photocell 4 takes their place. Resistance 12 is adjusted to obtain balance of photocells 3 and 4 at this temperature. The system is then calibrated. The measuring telescope 3 is connected to a recording electronic potentiometer 16 which registers the voltage at the terminals of this telescope and consequently the flame temperature.

Each measuring telescope comprises (Fig. 2) an external fluid-cooled jacket 17 and a protecting glass 18 facing the flame and absorbing radiations to which the cell is not sensitive, whereby excessive heating of said cell is avoided. This protectoing glass is protected against ejected particles and the radiations of the flame by a cylindrical tube 19. Behind said protecting glass are arranged consecutively a converging objective lens 20 with a diaphragm, then several other diaphragms 21 for reducing the parasite internal reflections against the inside of the jacket which is blackened. On the last diaphragm, at the rear, is formed the real image of the lamp filament given by the objective lens of the telescope. Behind this diaphragm, at a suitable distance, is arranged a photocell which is a barrier layer cell 22 the sensitive face of which receives the light-flux that passes through the diaphragm.

The rear portion of the telescope comprises a revolving disc 23 in front of which is a stationary ground glass 24, said disc carrying at least one photocell 22 in front of which is a colored filter 25. By revolving the disc, either one of the photocells or a hole 26 may be brought into the light-flux to obtain a correct focus and alignment of the two optical axes of the two devices by means of the ground glass 24. This arrangement makes it possible to select the range of lightwave length that is more appropriate to the case in consideration. The particular photocell which is working on the disc is automatically connected to the measuring and adjusting circuit by a metal leaf contact 27.

The above described device may be used in many applications either alone or combined with other recorders.

It is to be understood that the form of the invention herewith shown and described is to be taken as a preferred example of the same, and that various changes in the shape, size and arrangement of parts may be resorted to without departing from the spirit of the invention or the scope of the subjoined claims.

What we claim is:

1. A system for continuously indicating and recording the true temperature of a luminous flame, comprising a light source mounted at one side of the flame; two identical measuring telescopes each including a receiver of radiant energy having the same response for all temperatures, one of said telescopes being positioned adjacent the light source and receiving radiant energy only from the light source and the other telescope being positioned adjacent the flame on the other side of the light source, the flame being positioned between the light source and said other telescope, which receives radiant energy from the flame and the light source; a differential electrical measuring apparatus; means for connecting both said measuring telescopes to said apparatus in opposition so as to produce an output which will represent the difference in the outputs of said measuring telescopes, means responsive to the output of said measuring apparatus for controlling the intensity of said light source, so that the output of said measuring apparatus will have a predetermined value; and recording means in the circuit of said other measuring telescope for recording the variations of current through the receiver thereof.

2. The system of claim 1, further comprising filter means at each measuring telescope, said filter means being positioned in the path of radiant energy reaching the telescope for filtering out radiant energy of predetermined wavelengths.

3. The system of claim 1, in which the receiver in each telescope includes a barrier layer photocell and the recording means in the circuit of said other telescope is a recording electronic potentiometer connected directly to the barrier layer photocell thereof to record variations of the lighting flame brightness.

4. A system for continuously indicating and recording the true temperature of a luminous flame, comprising a light source mounted at one side of the flame; two identical measuring telescopes each including a receiver of radiant energy having the same response for all temperatures, one of said telescopes being positioned adjacent the light source and receiving radiant energy only from the light source and the other telescope being positioned adjacent the flame on the other side of the light source, the flame being positioned between the light source and said other telescope, which receives radiant energy from the flame and the light source, each measuring telescope comprising a disc mounted for rotation in the plane of the radiant energy receiver, said receiver being mounted on said disc and the disc having a hole therein substantially the same distance from the center of the disc as said receiver whereby said disc may be rotated to bring either the hole or the radiant energy receiver in position to receive radiant energy from the light source; a differential electrical measuring apparatus; means for connecting both measuring telescopes to said apparatus in opposition so as to produce an output which will represent the difference in the outputs of said telescopes; means responsive to the output of said measuring apparatus for controlling the intensity of the light source so that the output of said measuring apparatus will have a predetermined value; and recording means in the circuit of said other measuring telescope for recording the variations of current through the receiver thereof.

5. The system of claim 4, in which the radiant energy receiver of each measuring telescope is a barrier layer photocell.

(References on following page)

References Cited in the file of this patent

UNITED STATES PATENTS

| | | |
|---|---|---|
| 2,241,557 | Nichols | May 13, 1941 |
| 2,244,732 | Schmitt | June 10, 1941 |
| 2,245,034 | Harrison | June 10, 1941 |
| 2,690,511 | Elion | Sept. 28, 1954 |

OTHER REFERENCES

"The absorption-emission pyrometer: a new method for measuring flame temperatures," article in Instruments, vol. 20, November 1947, pp. 978, 980; publ. by Instruments Publ. Co., 921 Ridge Ave., Pittsburgh, Penna.